US007821919B2

(12) United States Patent
Mizutani et al.

(10) Patent No.: US 7,821,919 B2
(45) Date of Patent: Oct. 26, 2010

(54) DATA PROCESSING APPARATUS AND DATA PROCESSING METHOD

(75) Inventors: Fumitoshi Mizutani, Tokyo (JP); Shinya Oda, Tokyo (JP)

(73) Assignee: NEC Corporation, Tokyo (JP)

(*) Notice: Subject to any disclaimer, the term of this patent is extended or adjusted under 35 U.S.C. 154(b) by 1453 days.

(21) Appl. No.: 10/827,433

(22) Filed: Apr. 20, 2004

(65) Prior Publication Data

US 2004/0208130 A1 Oct. 21, 2004

(30) Foreign Application Priority Data

Apr. 21, 2003 (JP) ............................. 2003-115621

(51) Int. Cl.
*H04J 1/16* (2006.01)
*H04J 3/14* (2006.01)
*G06F 11/00* (2006.01)

(52) U.S. Cl. ........................... 370/216; 370/242; 714/2

(58) Field of Classification Search ................ 370/242; 714/2–4, 10

See application file for complete search history.

(56) References Cited

U.S. PATENT DOCUMENTS

| 4,860,119 | A | * | 8/1989 | Maniwa et al. ............... 358/296 |
| 5,422,893 | A | | 6/1995 | Gregg |
| 5,502,733 | A | | 3/1996 | Kishi |
| 5,630,056 | A | | 5/1997 | Horvath et al. |
| 6,151,154 | A | | 11/2000 | Ogasawara et al. |
| 6,330,701 | B1 | | 12/2001 | Rosendahl et al. |
| 6,496,940 | B1 | | 12/2002 | Horst et al. |
| 6,791,927 | B2 | | 9/2004 | Yamanaka |

| 7,068,576 | B2 | 6/2006 | Kobayashi |

FOREIGN PATENT DOCUMENTS

| EP | 0 747 803 A | 12/1996 |
| JP | 01-154242 | 6/1989 |
| JP | 02-218022 | 8/1990 |
| JP | 02-264337 | 10/1990 |
| JP | 4-71037 A | 3/1992 |
| JP | 05-241095 | 9/1993 |
| JP | 06-324281 | 11/1994 |
| JP | 8-278950 A | 10/1996 |
| JP | 09-063108 | 3/1997 |
| JP | 9-128349 | 5/1997 |
| JP | 10-154085 | 6/1998 |
| JP | 11-144294 | 5/1999 |
| JP | 11-296394 | 10/1999 |
| JP | 2000-040249 A | 2/2000 |
| JP | 2001-290668 A | 10/2001 |
| JP | 2001-526422 A | 12/2001 |
| JP | 2002-133697 A | 5/2002 |
| JP | 2002-342975 A | 11/2002 |
| JP | 2002-373445 A | 12/2002 |
| WO | WO 99/26133 A | 5/1999 |

* cited by examiner

*Primary Examiner*—Chirag G Shah
*Assistant Examiner*—Srinivasa R Reddivalam
(74) *Attorney, Agent, or Firm*—Foley & Lardner LLP

(57) ABSTRACT

Each of memory bridges and I/O bridges, cross-linked to one another, is provided with an interface circuit section which performs data transmission and reception according to an PCI-Express interface. Each interface circuit section has a communication error processing section. When an error occurs in data received from the I/O bridge, the communication error processing section of the memory bridge cancels the received data and sends a communication error signal to the memory bridge. When receiving the communication error signal, the memory bridge stops receiving the data. Then, the communication error processing section of the memory bridge requests the I/O bridge to resend data.

17 Claims, 11 Drawing Sheets

DATA PROCESSING APPARATUS AND DATA PROCESSING METHOD

BACKGROUND OF THE INVENTION

1. Field of the Invention

The present invention relates to a data processing apparatus and a data processing method which process same data in parallel.

2. Description of the Related Art

One of computer systems which perform data processing is a fault-tolerant computer system which has a redundant architecture designed using existing components as disclosed in, for example, pages 5 to 7 and FIG. 1 of Unexamined Japanese Patent Application KOKAI Publication No. H9-128349. This computer system employs a lock-step system.

In the lock-step system, first, a plurality of processors with a redundant architecture synchronously process same data in parallel. Then, the outputs from the processors are compared with one another to detect an error if any and the error is corrected.

Recent computer systems are employing a fast serial link system, such as the PCI-Express, Hyper-Transport (registered trademark) or InfiniBand (registered trademark), which can ensure fast data transmission and reception, to connect processors to I/O (Input/Output) systems.

While the use of such a fast data transmission and reception system in the computer system with the redundant architecture indeed makes the data transmission and reception speed faster, the structure makes it harder to guarantee the identity of data to be processed by plural processors and makes it easier to cause communication errors.

When detecting communication errors, for example, individual interface sections which intervene data transmission and reception between processors and I/O systems, the interface sections request resending of data at their own timings different from one another. Accordingly, the timing and order of processes to be executed by the individual processors deviate, so that the lock-step system cannot be maintained. This makes it difficult for plural processors to synchronously process same data.

When only some of plural interface sections have detected communication errors, for example, the interface sections that have detected the communication errors do not share the error information with the other interface sections. While those interface sections which have detected the communication errors request resending of data, therefore, those interface sections which have not detected them receive data as it is. In this case, the timing of the subsequent processing of the received pieces of data, the same though they are, deviates, so that the identity of data in parallel processing cannot be guaranteed.

Further, such a computer system is likely to suffer a data delay originated from the lengths of communication lines. When the data delay shifts the timing of processing by plural processors, the plural processors have a difficulty in synchronously processing same data as in the case mentioned previously. This requires that the equal line lengths should be provided strictly, thus placing considerable restrictions on the degree of freedom on the structure of the casing of the system, the design of the board, and the structure of the board.

SUMMARY OF THE INVENTION

Accordingly, it is a primary object of the invention to provide a data processing apparatus and a data processing method which can synchronously process same data even when a communication error occurs.

It is another object of the invention to provide a data processing apparatus and a data processing method which can guarantee the identity of data when same data is processed in parallel.

It is a further object of the invention to provide a data processing apparatus and a data processing method which can allow a computer system to be designed without suffering any restriction on the lengths of communication lines.

To achieve the objects, according to the first aspect of the invention, there is provided a data processing apparatus that has a plurality of reception interface sections (16, 26) which receive same data from a same data sender and processes data, received by the plurality of reception interface sections, in parallel. In the data processing apparatus, each of the reception interface sections includes a communication error processing section which, upon occurrence of an error in the received data, stops receiving the data, sends a communication error signal to stop data reception from the data sender to other reception interface sections, and requests the data sender to resend data.

This structure can permit synchronous processing of same data even when a communication error occurs.

In the data processing apparatus, when an error occurs in part of received data, the communication error processing section of each of the reception interface sections may cancel the error-occurred data, and request the data sender to resend the canceled data.

The data sender may send same serial data, and when an error occurs in received serial data, the communication error processing section of each of the reception interface sections may cancel the error-occurred serial data and serial data received following that error-occurred serial data, and request the data sender to resend the canceled serial data.

The data sender may send the data packet by packet with a sequence number affixed to each packet, and when an error occurs in data of the received packet, the communication error processing section of each of the reception interface sections may request the data sender to resend data packet by packet based on the sequence number affixed to each packet received.

The data processing apparatus may further comprise a frequency divider which generates a sync signal by dividing a frequency of a predetermined clock signal and sends the generated sync signal to each of the reception interface sections, and each of the reception interface sections may receive data according to the sync signal supplied from the frequency divider.

According to the second aspect of the invention, there is provided a data processing apparatus that has a transmission interface section which transmits transmission data to a plurality of data receivers at a same timing. In the data processing apparatus, the transmission interface section generates packet data by dividing the transmission data to data of a data length sendable within one period of a predetermined clock signal and sends individual pieces of packet data generated to the plurality of data receivers at the same timing in synchronism with the clock signal.

According to the third aspect of the invention, there is provided a data processing method that performs parallel processing of data received by a plurality of reception interface sections which receive same data from a same data sender. The data processing method comprises:

a data reception step of receiving data from the data sender at one of the plurality of reception interface sections;

an error detection step of detecting an error in the received data; and an error information output step of outputting information on the detected error to other reception interface sections.

The data reception step and the error information output step may be executed according to a sync signal generated by dividing a frequency of a predetermined clock signal.

The data pressing method may further comprise:

an error information reception step of receiving error information, output from the other reception interface sections, at the one of the reception interface sections; and a data resend requesting step of requesting the data sender to resend data in at least one of a case where an error is detected at the error detection step and a case where error information is received at the error information reception step.

The data processing method may further comprise:

a data cancellation step of canceling data; and a data reception stopping step of stopping data reception, and wherein the data cancellation step and the data reception stopping step are executed in at least one of a case where an error is detected at the error detection step and a case where error information is received at the error information reception step, and the data resend requesting step requests resending of data canceled at the data cancellation step.

The data cancellation step may be executed according to the sync signal.

According to the fourth aspect of the invention, there is provided a computer program that performs parallel processing of data received by a plurality of reception interface sections which receive same data from a same data sender. The computer program allows a computer to execute:

a data reception step of receiving data from the data sender at one of the plurality of reception interface sections;

an error detection step of detecting an error in the received data; and an error information output step of outputting information on the detected error to other reception interface sections.

The data reception step and the error information output step may be executed according to a sync signal generated by dividing a frequency of a predetermined clock signal.

The computer may be allowed to further execute:

an error information reception step of receiving error information, output from the other reception interface sections, at the one of the reception interface sections; and a data resend requesting step of requesting the data sender to resend data in at least one of a case where an error is detected at the error detection step and a case where error information is received at the error information reception step.

The computer may be allowed to further execute:

a data cancellation step of canceling data; and a data reception stopping step of stopping data reception, and the data cancellation step and the data reception stopping step may be executed in at least one of a case where an error is detected at the error detection step and a case where error information is received at the error information reception step, and the data resend requesting step may request resending of data canceled at the data cancellation step.

The data cancellation step may be executed according to the sync signal.

The invention can permit synchronous processing of same data even when a communication error occurs.

The invention can guarantee the identity of data when same data is processed in parallel.

The invention can allow a computer system to be designed without suffering any restriction on the lengths of communication lines.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

A data processing apparatus according to one preferred embodiment of the invention is described below with reference to the accompanying drawings.

The data processing apparatus according to the embodiment is explained as a computer system which has a redundant architecture.

Figure 1:
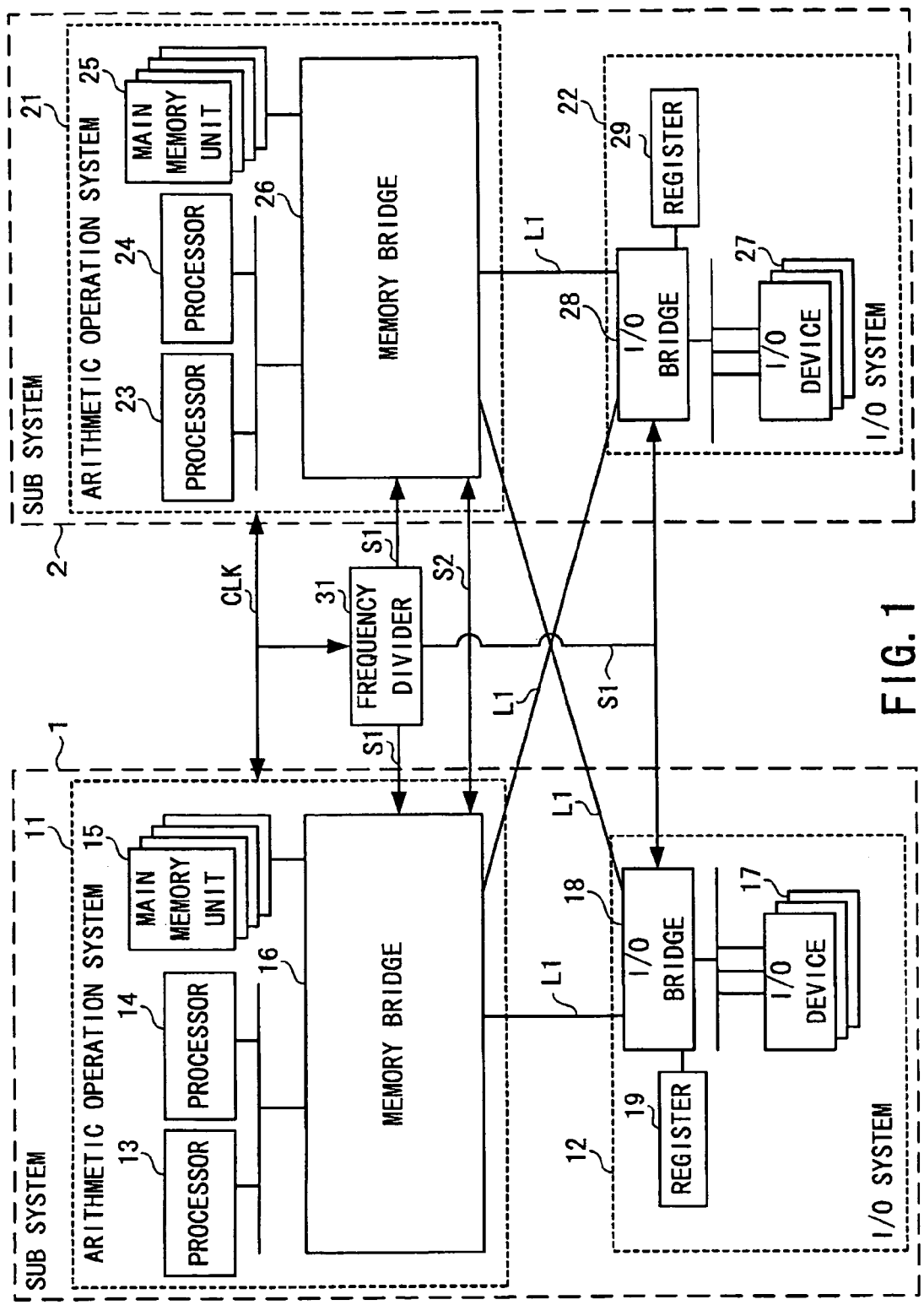
FIG. 1 is a block diagram illustrating the architecture of a computer system according to an embodiment of the invention.

FIG. 1 illustrates the architecture of a computer system according to the embodiment.

The computer system according to the embodiment is a fault-tolerant computer system which has a plurality of processors with a redundant architecture and sub systems 1 and 2. This system operates according to the "lock-step system" in which plural processors synchronously process same data in parallel.

The sub system 1 has an arithmetic operation system 11 and an I/O (Input/Output) system 12. The sub system 2 has an arithmetic operation system 21 and an I/O system 22.

The arithmetic operation systems 11 and 21 are supplied with synchronous clock signals CLK of 166 MHz. Accordingly, the sub systems 1 and 2 synchronously and simultaneously execute the same process according to the lock-step system.

A frequency divider 31 is connected between the sub systems 1 and 2. The frequency divider 31 frequency-divides the supplied clock signal CLK of an FSB (Front Side Bus), thereby generating a sync signal S1.

The frequency divider 31 supplies the generated sync signal S1 to a memory bridge 16 of the arithmetic operation system 11, a memory bridge 26 of the arithmetic operation system 21, an I/O bridge 18 of the I/O system 12 and an I/O bridge 28 of the I/O system 22.

It is premised in the embodiment that the PCI-Express interface is used in data transmission and reception. The PCI-Express interface employs a serial link to prevent data skew between signal lines that occurs in a parallel bus. The arithmetic operation systems 11 and 21 and the I/O systems 12 and 22 are connected to one another according to the PCI-Express interface.

The frequency divider 31 divides the frequency of 166 MHz of the clock signal CLK to a one-sixteenth frequency of 10.4 MHz in such a way that one period of the sync signal S1 becomes equivalent to 24 symbol times of the PCI-Express interface of 2.5 Gbps/lane.

According to the PCI-Express interface, devices, such as the arithmetic operation systems 11 and 21 and the I/O systems 12 and 22, are connected one to one. When data is transferred using a differential signal, the link uses four signal lines bidirectionally, two in one direction. The set of four signal lines is called a lane.

One symbol time is the time needed to send valid data of 1 byte according to the PCI-Express interface after data in one lane is encoded with 8B/10B.

As the frequency of the sync signal S1 becomes 10.4 MHz, the I/O bridges 18 and 28 and the memory bridges 16 and 26 can send valid data of 24 bytes per lane to one another in one period of the sync signal S1.

The arithmetic operation system 11 has processors 13 and 14, a main memory unit 15 and the memory bridge 16. The arithmetic operation system 21 has processors 23 and 24, a main memory unit 25 and the memory bridge 26.

The processors 13, 14, 23 and 24 execute arithmetic operations. The main memory units 15 and 25 store data or so. The memory bridge 16 is connected to the processors 13 and 14 by the front side bus (FSB), and the memory bridge 26 is connected to the processors 23 and 24 by the front side bus (FSB). The memory bridges 16 and 26 operate in synchronism with the clock signal CLK.

The memory bridges 16 and 26 perform data transmission and reception with the I/O bridges 18 and 28. The memory bridges 16 and 26 send and receive a communication error signal S2 to and from each other. The memory bridges 16 and 26 share information on a communication error by the communication error signal S2 and execute an error process in concert with each other. The communication error signal S2 is sent and received as an open drain signal. The detailed structures of the memory bridges 16 and 26 will be discussed later.

The I/O system 12 has an I/O device 17, the I/O bridge 18 and a configuration register 19. The I/O system 22 has an I/O device 27, the I/O bridge 28 and a configuration register 29.

The I/O devices 17 and 27 perform data transmission and reception with the I/O bridges 18 and 28, respectively.

The I/O bridges 18 and 28 perform serial transmission with the I/O devices 17 and 27 or the memory bridges 16 and 26, respectively.

The I/O bridges 18 and 28 and the memory bridges 16 and 26 are connected together by ×8 links L1 of the PCI-Express interface.

The memory bridges 16 and 26 of the respective arithmetic operation systems 11 and 21 are cross-linked to the I/O bridges 18 and 28 of the respective I/O systems 12 and 22 by the links L1. That is, the memory bridge 16 of the arithmetic operation system 11 is connected to the I/O systems 12 and 22, and the I/O bridge 26 of the arithmetic operation system 21 is connected to the I/O systems 12 and 22.

This cross-link connection can allow each of the arithmetic operation systems 11 and 21 to communicate with the I/O systems 12 and 22. Accordingly, the each of the I/O systems 12 and 22 can communicate with the arithmetic operation systems 11 and 21.

To ensure layer-by-layer upgrading, the functions of the PCI-Express interface are hierarchized. The protocol is defined for each layer.

Figure 2:
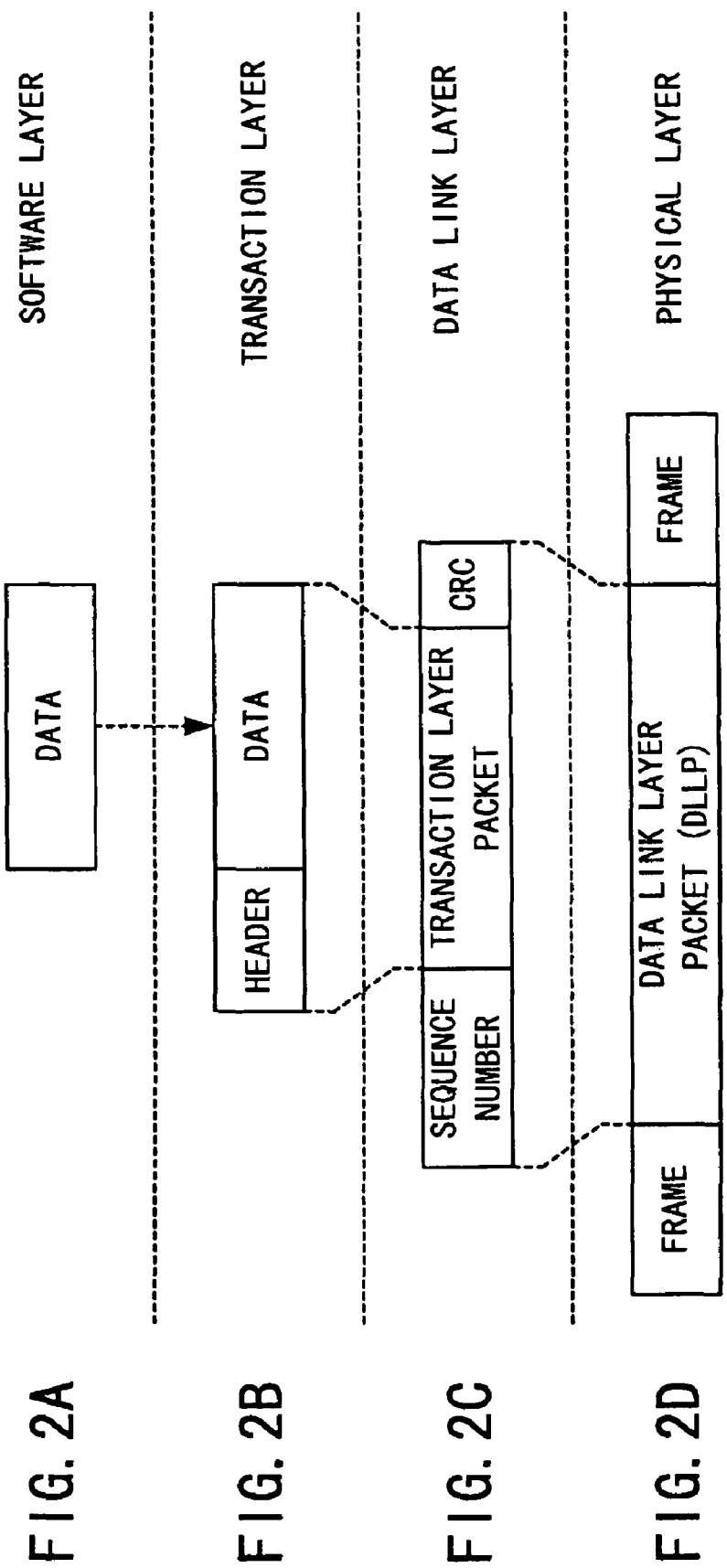
FIGS. 2A to 2D are explanatory diagrams showing the structure of packet data to be transmitted and received.

According to the PCI-Express interface, a header is added to data in a transaction layer to thereby generate a transaction layer packet as shown in FIGS. 2A and 2B.

As shown in FIG. 2C, a sequence number and CRC (Cyclic Redundancy Check) as status information is added to the transaction layer packet in a data link layer, thereby generating a data link layer packet (DLLP).

As shown in FIG. 2D, frame data is added to the data link layer packet in a physical layer. The resultant packet is transmitted and received.

Each of the I/O bridges 18 and 28 has an interface circuit section (not shown) for transmission and reception of data according to the PCI-Express interface.

Each of the configuration-registers 19 and 29 holds data for limiting the packet length and the number of pieces of data of an upstream packet to be sent from the I/O bridges 18 and 28 to the memory bridges 16 and 26 in one period of the sync signal S1 supplied from the frequency divider 31.

The packet length and the number of pieces of data are limited to prevent a packet to be sent from being influenced by the length of the transmission path and the drifting of the clock. Specifically, the maximum packet length of individual packets is 192 bytes.

According to the limitation, the I/O bridge 18 or 28 simultaneously sends the same packet to the respective memory bridges 16 and 26 at the rising timing of the sync signal S1.

When sending a plurality of small packets, the I/O bridges 18 and 28 perform transmission control so that the number of pieces of data does not exceed the maximum data number transmittable in one period of the sync signal S1. According to the control, the I/O bridges 18 and 28 work in such a way that transmission time of one packet does not exceed one period of the sync signal S1 of 10.4 MHz.

The values in the configuration registers 19 and 29 can be changed using the BIOS (Basic Input/Output System). The sub system 1, 2 has a non-volatile memory (not shown) to store the BIOS.

The computer system with the above-described architecture performs failure diagnosis by comparing communication contents exchanged between the sub systems. When deciding a specific sub system has failed, the computer system masks the sub system having failure and continues the process in progress using the remaining sub system.

The structures of the memory bridges 16 and 26 are discussed next. As the structure of the memory bridge 26 is the same as that of the memory bridge 16, only the structure of the memory bridge 16 is described below.

Figure 3:
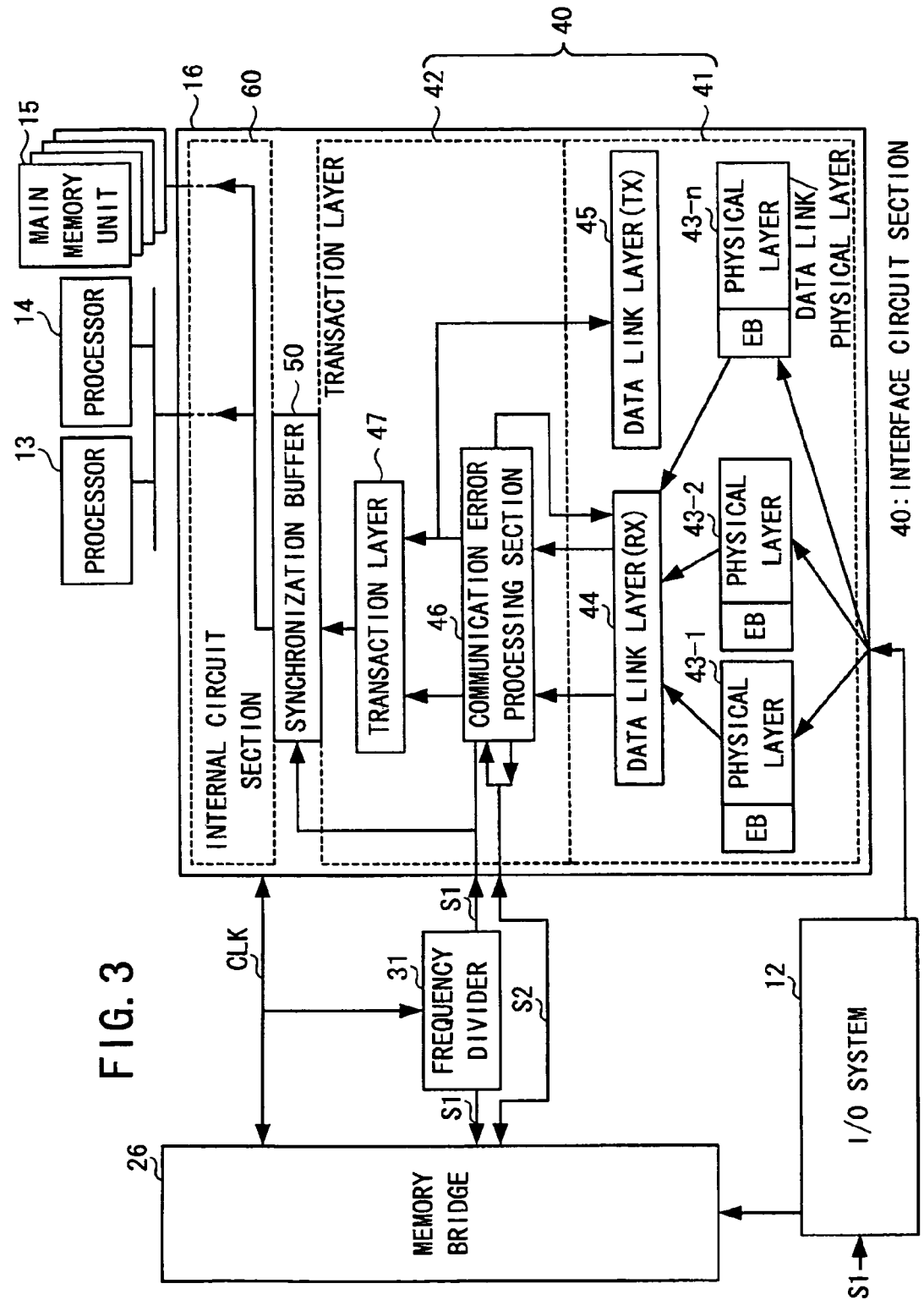
FIG. 3 is a block diagram showing the detailed structure of a memory bridge shown in FIG. 1.

The memory bridge 16 has an interface circuit section 40, a synchronization buffer 50 and an internal circuit section 60 as shown in FIG. 3.

The interface circuit section 40 is provided in association with the PCI-Express interface. The interface circuit section 40 is separated into a data link/physical layer 41 and a transaction layer 42.

The data link/physical layer 41 is separated into physical layers 43-1 to 43n, a data link layer (RX) 44 and a data link layer (TX) 45. The transaction layer 42 is separated into a communication error processing section 46 and a transaction layer 47.

The data link/physical layer 41, the transaction layer 42 and the internal circuit section 60 operate in synchronism with different clock signals.

The physical layers 43-1 to 43n send and receive packets shown in FIG. 2D in one period of the sync signal S1. The interface circuit section 40 has an elastic buffer (EB) to hold a packet to be transmitted or received The interface circuit section 40 outputs error information when a communication error is detected at the physical layers 43-1 to 43n.

The data link layer (RX) 44 acquires a data link layer packet from the packet shown in FIG. 2D.

The data link layer (TX) 45 receives an ACK/NACK/flow control signal output from the communication error processing section 46.

The communication error processing section 46 performs a process associated with a communication error.

According to the conventional PCI-Express, the data link layer (RX) 44 directly sends some error signals in status information to the transaction layer 47, and the data link layer (RX) 44 directly sends the ACK/NACK/flow control signal to the data link layer (TX) 45. According to the embodiment, the memory bridge 16 has the communication error processing section 46 which acquires the status information at the data link layer (RX) 44. The communication error processing section 46 sends the acquired status information to the transaction layer 47 and the data link layer (TX) 45.

The communication error processing section 46 checks the CRC affixed to the data link layer packet to detect a communication error if any. The communication error processing section 46 then outputs error information.

When no communication error is detected at the physical layers 43-1 to 43n and the data link layer (RX) 44, the communication error processing section 46 sends data and status information as they are to the transaction layer 47 and the data link layer (TX) 45. When the received data has no communication error, the interface circuit section 40 regularly returns an ACK signal to the I/O bridges 18 and 28 which have sent the data, according to the status information.

When a communication error is detected at the physical layers 43-1 to 43n or the data link layer (RX) 44, on the other hand, the communication error processing section 46 cancels all the packets received in one period of the sync signal S1 as lost packets. Then, the communication error processing section 46 stops outputting the received data to the transaction layer 47.

When canceling the packets, the communication error processing section 46 instructs the data link layer (RX) 44 to set the sequence number of a next packet to be received to the sequence number prior to the reception of the communication error packet.

When detecting a communication error, the communication error processing section 46 asserts or enables a communication error signal S2 for one period of the sync signal S1. The communication error processing section 46 sends the asserted communication error signal S2 to the memory bridge 26 via the signal line.

The transaction layer 47 accepts a read request and a write request from a higher-rank software layer and requests the data 11* layer (RX) 44 and the data link layer (TX) 45 to transfer a packet.

The synchronization buffer 50 serves to exchange data between the transaction layer 47 and the internal circuit section 60. The synchronization buffer 50 holds data output from the transaction layer 47.

The internal circuit section 60 acquires data held in the synchronization buffer 50 at the timing synchronous with the sync signal S1 and sends the acquired data to the processors 13 and 14 and the main memory unit 15.

In case where the I/O bridges 18 and 28 send serial data to the memory bridges 16 and 26, the interface circuit sections of the I/O bridges 18 and 28 become transmission interface sections and the interface circuit sections of the memory bridges 16 and 26 become reception interface sections.

As mentioned above, the memory bridges 16 and 26 can send serial data to the I/O bridges 18 and 28. In this case, the interface circuit sections of the memory bridges 16 and 26 become transmission interface sections and the interface circuit sections of the I/O bridges 18 and 28 become reception interface sections.

The operation of the computer system according to the embodiment is described next.

The following description will be given of the case where the I/O bridge 18 sends serial data to the memory bridges 16 and 26.

When supplied with data from the I/O device 17, the I/O bridge 18 adds a header to the serial data at the transaction layer as shown in FIGS. 2A and 2B. Then, the I/O bridge 18 generates a transaction layer packet.

As shown in FIG. 2C, the I/O bridge 18 adds the sequence number and CRC as status information to the generated transaction layer packet at the data link layer. Then, the I/O bridge 18 generates a data link layer packet.

Next, the I/O bridge 18 adds fame data to the generated data link layer packet at the physical layer, as shown in FIG. 2D. Then, the I/O bridge 18 sends the packet shown in FIG. 2D to the memory bridges 16 and 26 via the links L1.

The interface circuit section 40 of the memory bridge 16 receives the data at the physical layers 43-1 to 43n.

Figure 4:
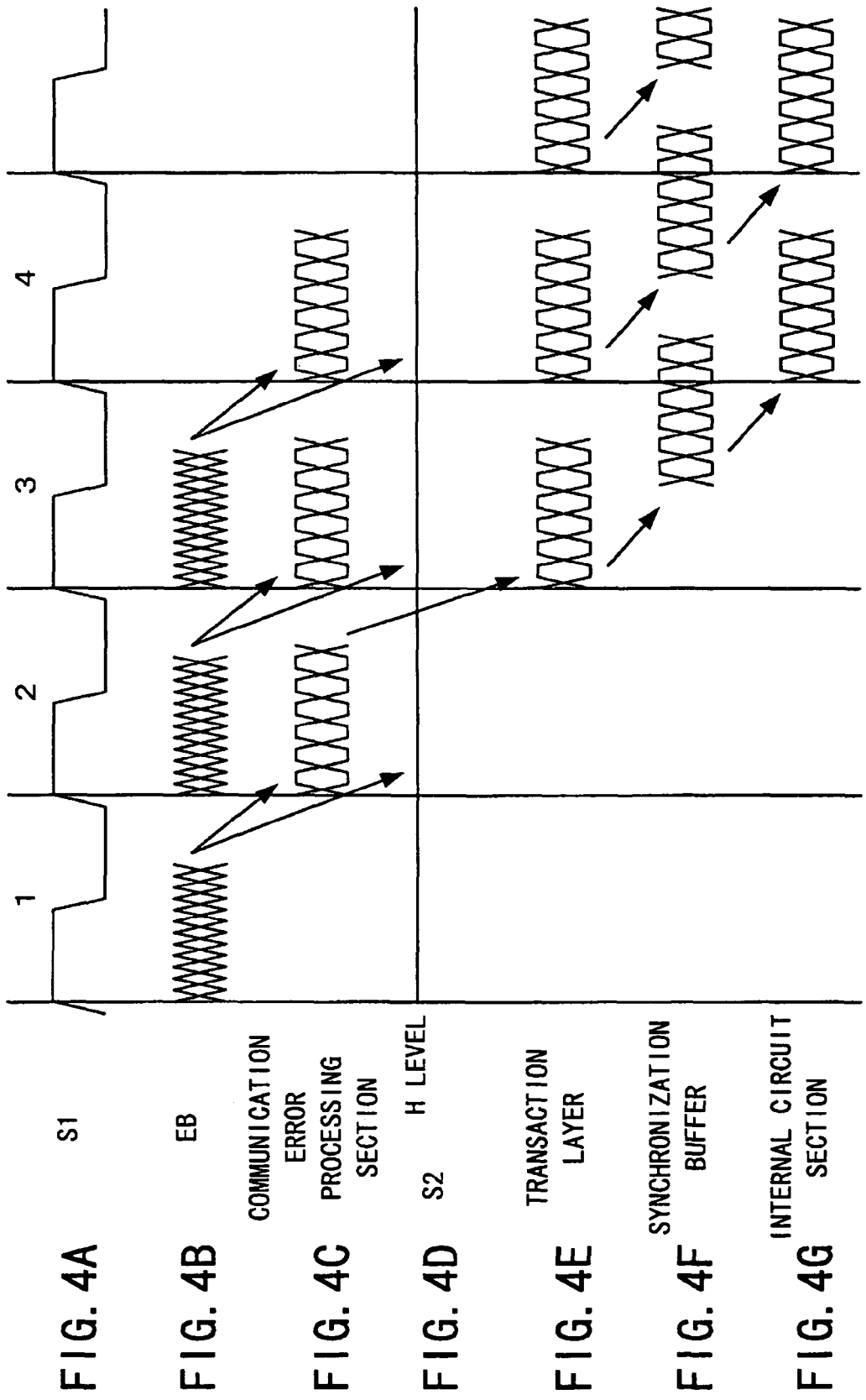
FIGS. 4A to 4G are timing charts illustrating the operation of the memory bridge shown in FIG. 1.

The interface circuit section 40 temporarily stores all the packets, received at the physical layers 43-1 to 43n in one period of the sync signal SI, in the elastic buffer as shown in FIGS. 4A and 4B. Then, the interface circuit section 40 sends the stored packets to the data link layer (RX) 44.

The interface circuit section 40 acquires a data link layer packet from the packet shown in FIG. 2D at the data link layer (RX) 44. The interface circuit section 40 performs error detection based on the CRC included in the data link layer packet shown in FIG. 2C.

As shown in FIG. 4C, the communication error processing section 46 acquires packets received in each period of the sync signal S1 in synchronism with the next rising of the sync signal S1.

When no error is detected in the received packets, as shown in FIG. 4D, the communication error processing section 46 sets the communication error signal S2 to a high (H) level to deassert or disable the communication error signal S2. Therefore, the received packets become valid.

Then, the communication error processing section 46 sends each packet to the transaction layer 47 in synchronism with the next rising of the sync signal S1 as shown in FIG. 4E.

The interface circuit section 40 acquires a transaction layer packet from the data link layer packet at the transaction layer 47. The interface circuit section 40 then acquires data from the transaction layer packet and sends the data to the synchronization buffer 50 as shown in FIG. 4F.

The internal circuit section 60 acquires data from the synchronization buffer 50 in synchronism with the rising of the sync signal S1. Then, the internal circuit section 60 sends the acquired data to the processors 13 and 14 and the main memory unit 15.

Figure 5:
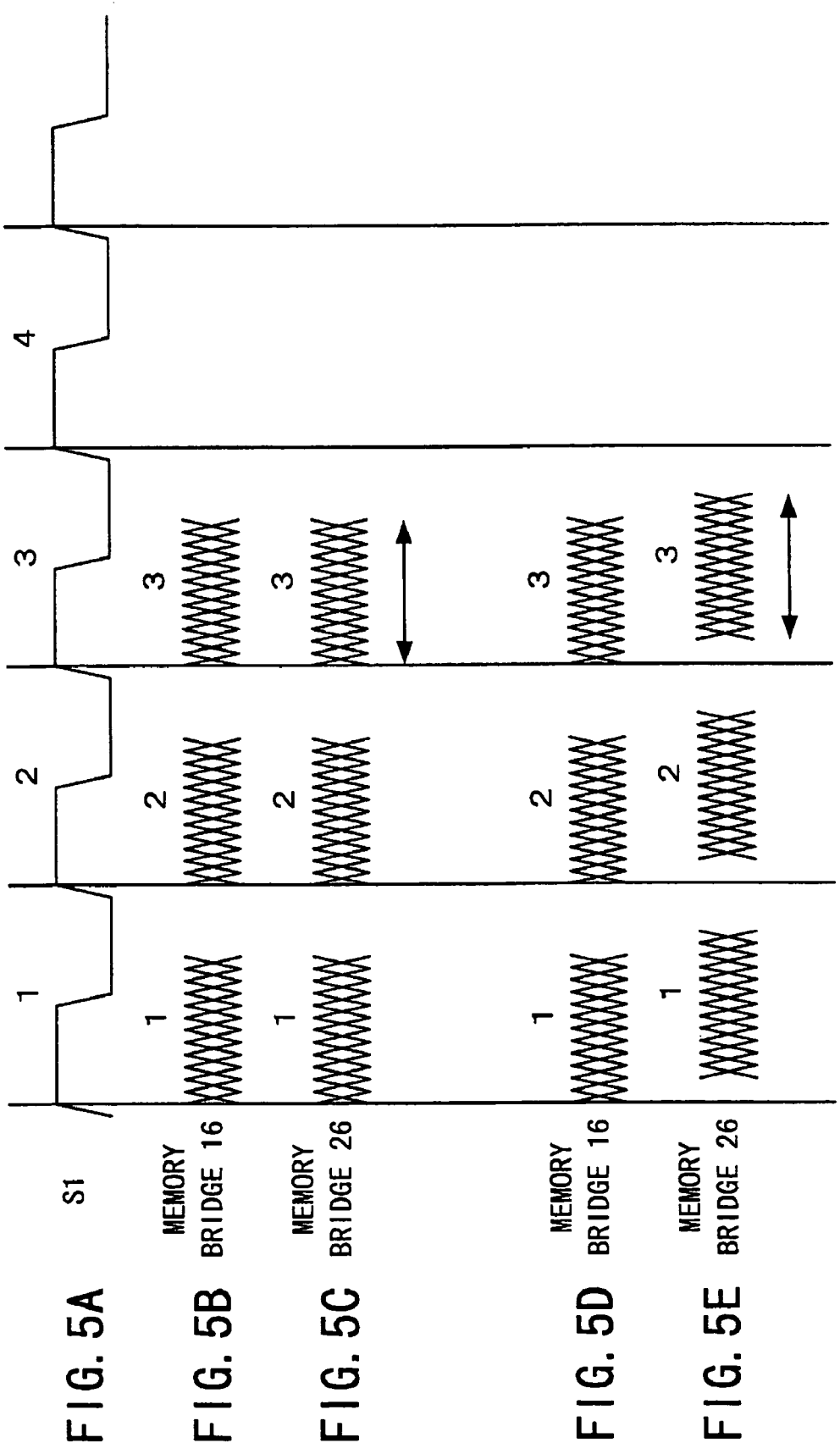
FIGS. 5A to 5E are timing charts illustrating the operation of the memory bridge shown in FIG. 1.

In case where the I/O bridge 18 sends data to the memory bridges 16 and 26, the memory bridges 16 and 26 receive data nearly at the same time as shown in FIGS. 5B and 5C, if the length of the link L1 between the I/O bridge 18 and the memory bridge 16 and the length of the link L1 between the I/O bridge 18 and the memory bridge 26 hardly differ from each other.

When the link L1 between the I/O bridge 18 and the memory bridge 26 is longer than the link L1 between the 110 bridge 18 and the memory bridge 16, however, the timings at which the memory bridges 16 and 26 receive data differ from each other, as shown in FIGS. 5D and 5E.

If there is a timing difference, when the difference lies within the same period of the sync signal S1, the arithmetic operation systems 11 and 21 executes the same process in synchronism with the clock signal CLK.

If the memory bridge 26 receives data over the first period and the second period of the sync signal S1, the I/O bridge 18 changes data stored in the configuration register 19 using the BIOS in such a way as to make the length of data in one packet shorter.

Figure 6:
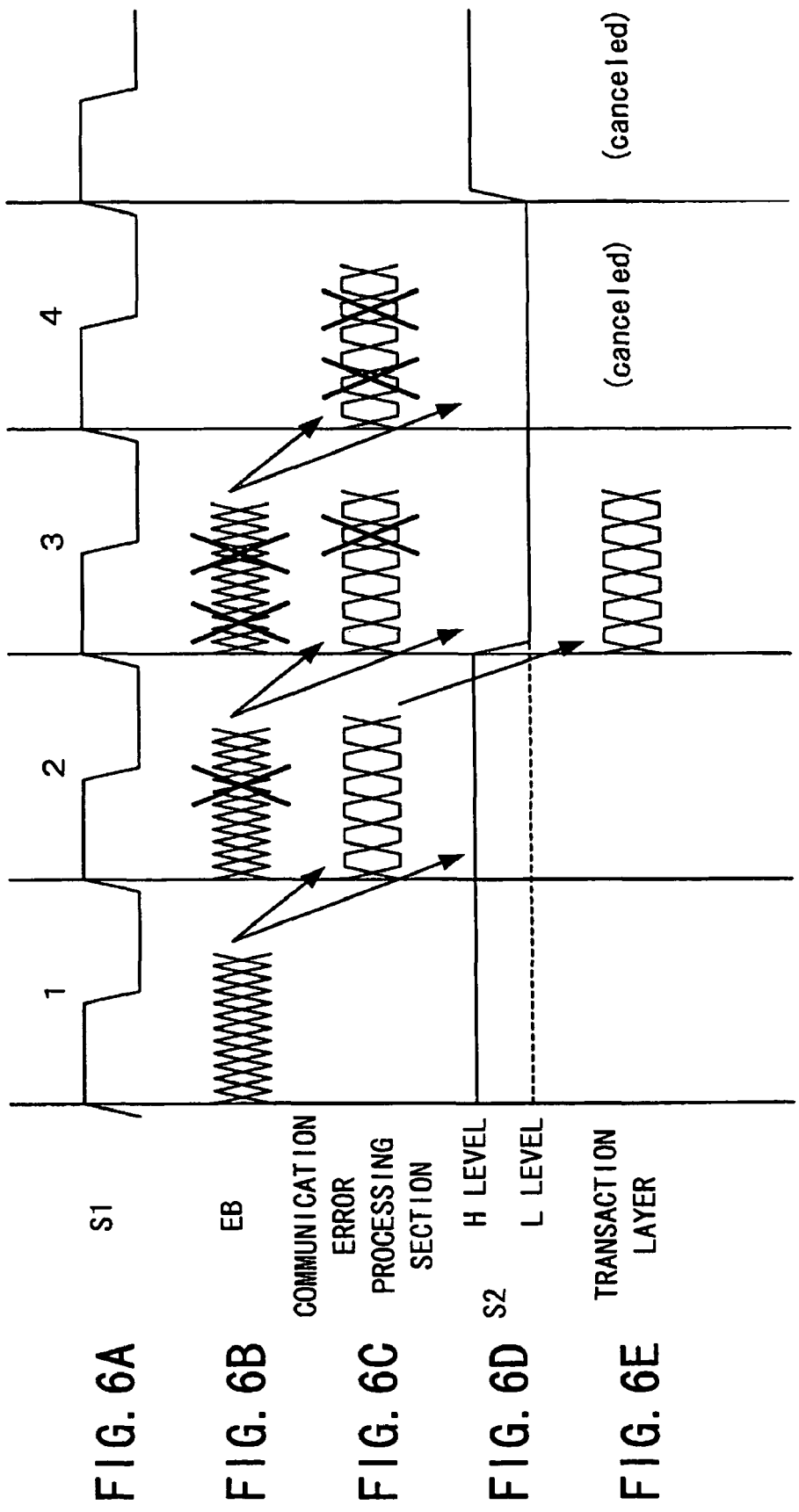
FIGS. 6A to 6E are timing charts illustrating the operation of the memory bridge shown in FIG. 1.

Next, the interface circuit section 40 of the memory bridge 16 detects a communication error in the packet received at the second clock cycle of the sync signal S1 as shown in FIGS. 6A and 6B.

In this case, as shown in FIGS. 6C and 6E, the communication error processing section 46 cancels all the packets at the third clock cycle even if the packets include a data link layer packet (DLLP).

The communication error processing section 46 cancels packets at and following the third clock cycle. The communication error processing section 46 cancels reception of all packets until the packets canceled at the third clock cycle are sent again.

When detecting a communication error, the communication error processing section 46 sets the sequence number of the packet managed at the data link layer (RX) 44 to the sequence number prior to the occurrence of the communication error.

When detecting a communication error, as shown in FIG. 6D, the communication error processing section 46 sets the communication error signal S2 to a low (L) level to assert or enable the communication error signal S2. At the fourth clock cycle of the sync signal S1, no packets are received so that the communication error signal S2 is deasserted.

The communication error processing section 46 request the I/O bridge 18 or the data sender to resend data. When receiving a resend request from the memory bridge 16, the I/O bridge 18 resends a packet whose resending is requested. The I/O bridge 18 resends a packet whose transmission has not been acknowledged even when a predetermined period has passed without an ACK signal returned from the memory bridge 16.

Figure 7:
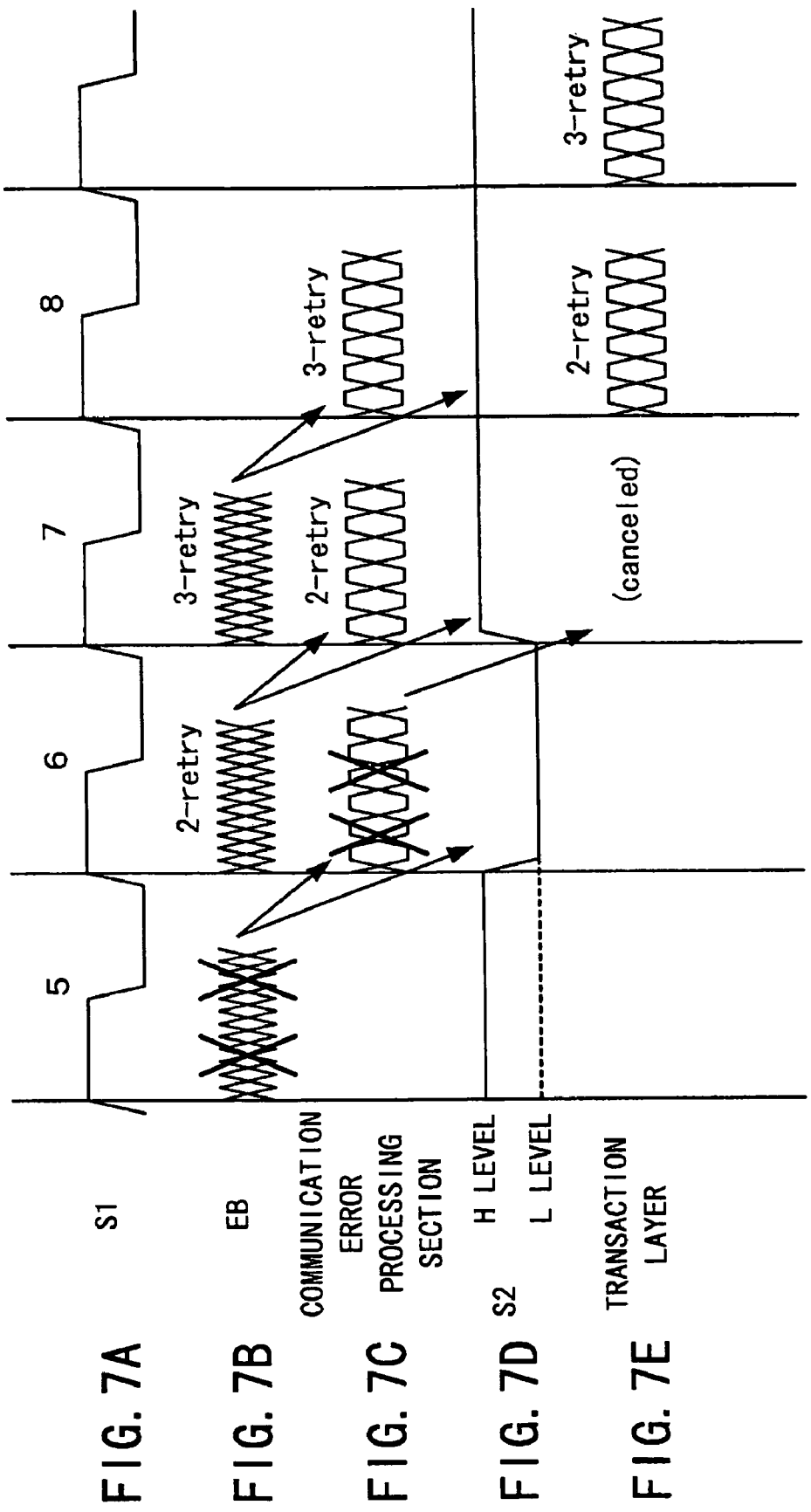
FIGS. 7A to 7E are timing charts illustrating the operation of the memory bridge shown in FIG. 1.

Subsequently, the memory bridge 16 receives a packet with a sequence number 2 in response to the resent request at the sixth clock cycle of the sync signal S1 as shown in FIG. 7B. When there is no communication error, the interface circuit section 40 receives the packets canceled at and following the third clock cycle as shown in FIGS. 7C, 7D and 7E.

Figure 8:
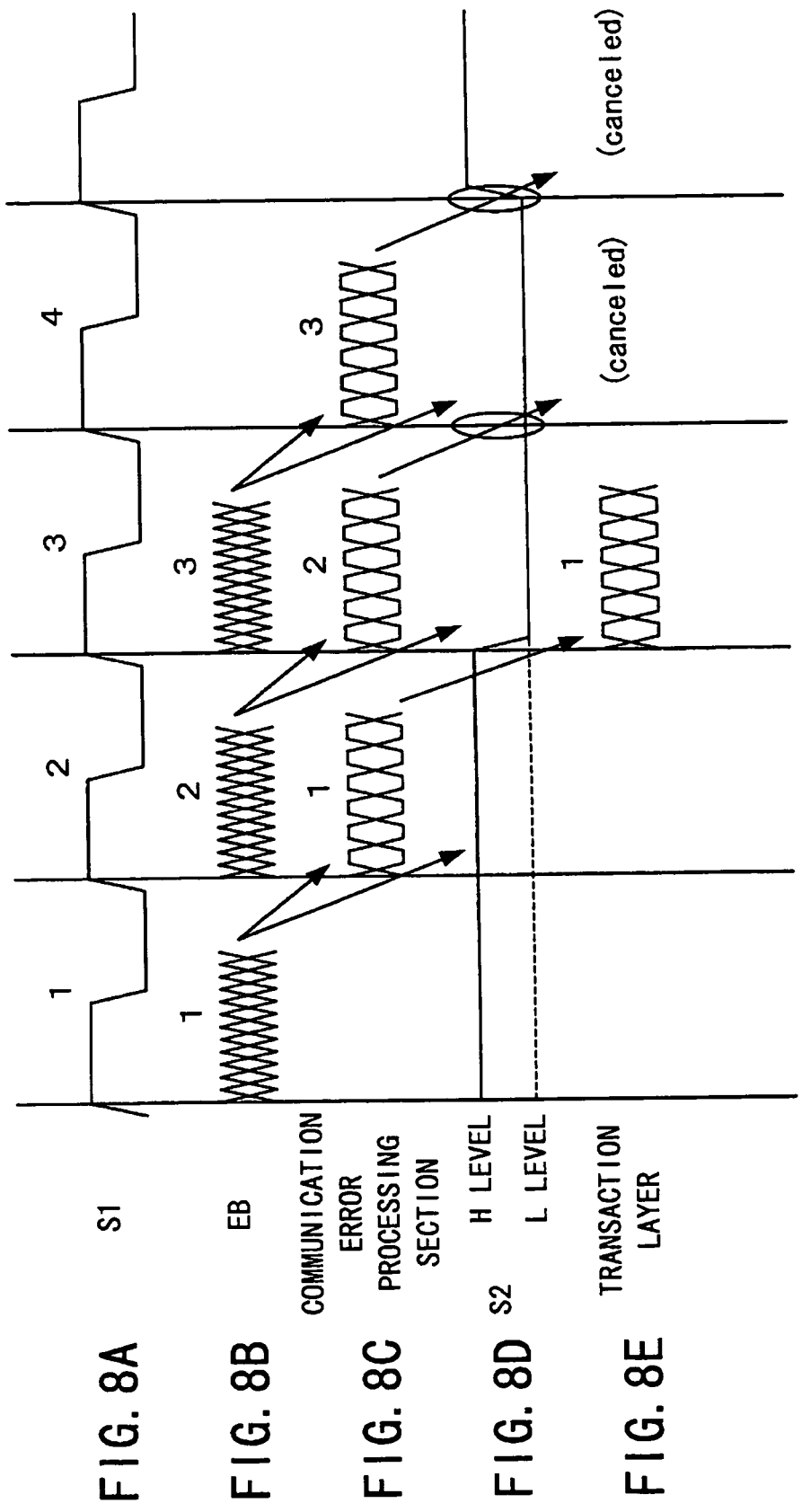
FIGS. 8A to 8E are timing charts illustrating the operation of the memory bridge shown in FIG. 1.

Next, even if the memory bridge 16 detects no communication error in the received data as shown in FIGS. 8A, 8B and 8C, when the memory bridge 26 detects a communication error, the memory bridge 26 sends the low-level communication error signal S2 to the memory bridge 16 as shown in FIG. 8D.

When the memory bridge 26 asserts the communication error signal S2 at the third clock cycle of the sync signal S1, the communication error processing section 46 cancels the packet with the sequence number 2, held in the communication error processing section 46 at the third clock cycle of the sync signal S1, as shown in FIG. 8E.

At and following the fourth clock cycle of the sync signal S1, the communication error processing section 46 stops giving a packet to the transaction layer 47.

The communication error processing section 46 then sets the sequence number of a packet to be received next, which is managed by the data link layer (RX) 44, to the value prior to the packet cancellation.

Figure 9:
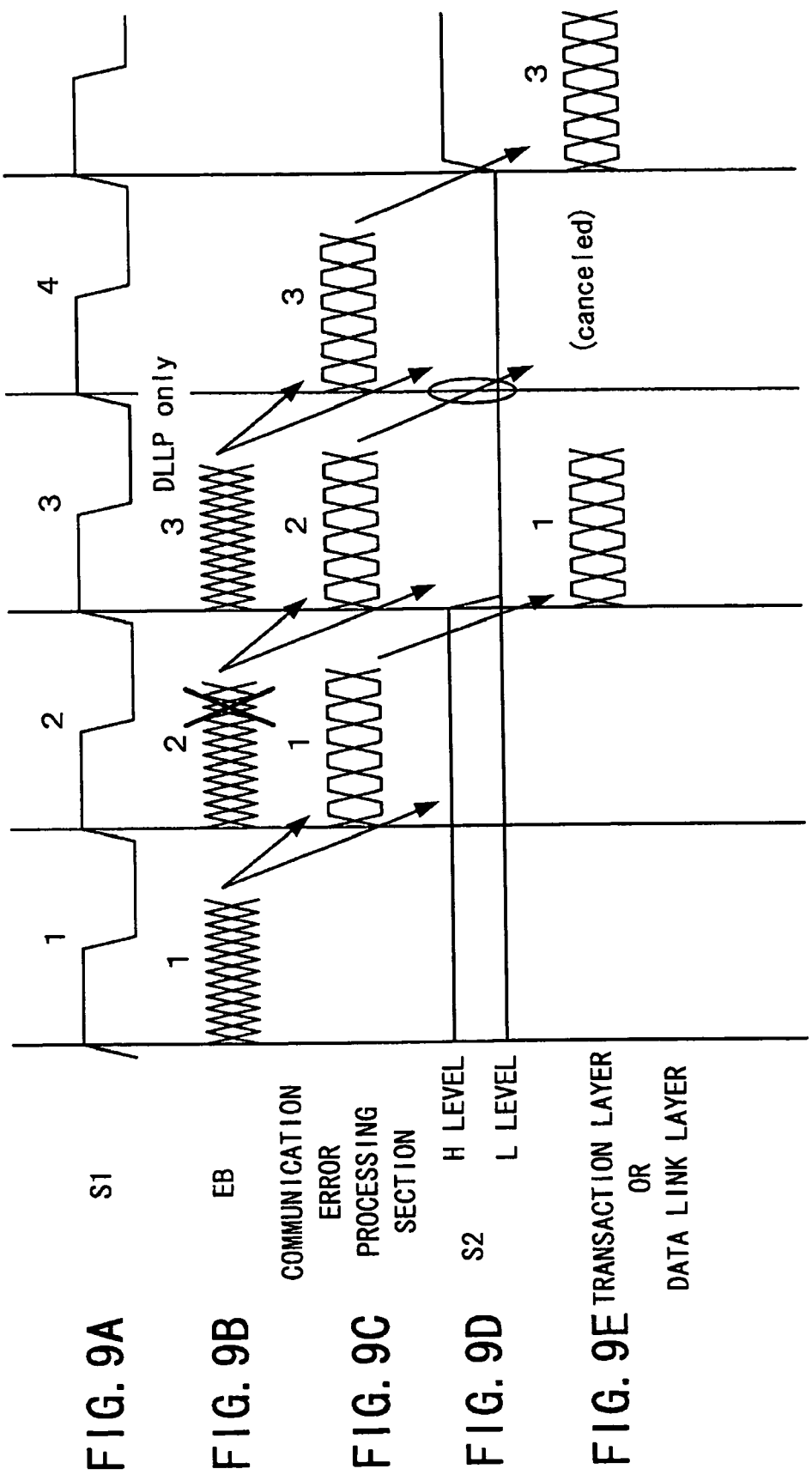
FIGS. 9A to 9E are timing charts illustrating the operation of the memory bridge shown in FIG. 1.

When the memory bridge 16 receives a packet constructed only by a data link layer packet following a packet having a communication error as shown in FIGS. 9A and 9B, the communication error processing section 46 cancels the packet having the communication error first as shown in FIGS. 9C and 9E.

When canceling the packet having the communication error, the communication error processing section 46 asserts the communication error signal S2 to request resending of a sequence of packets with and following the sequence number 2, as shown in FIG. 9D. While canceling the packet having the communication error, however, the communication error processing section 46 does not cancel the data link layer packet received at the third clock cycle of the sync signal SI, as shown in FIGS. 9C and 9E. This is because the data link layer packet has no sequence number so that a sequence number error does not occur.

The communication error processing section 46 can specify the order from the sequence numbers of resent packets without canceling the data link layer packet. Accordingly, the memory bridge 16 can receive resent packets without problems.

According to the embodiment, as explained above, when the interface circuit section 40 of the memory bridge 16 detects a communication error, the communication error processing section 46 cancels the received packet Then, the communication error processing section 46 sends the asserted communication error signal S2 to the memory bridge 26 and request the packet sender to resend the canceled packet.

Even when a communication error occurs, therefore, the communication error processing sections of the memory bridges 16 and 26 cooperate to request the packet sender to resend a packet Accordingly, a deviation in synchronism of received data can be avoided. The arithmetic operation systems 11 and 21 can therefore process same data synchronously.

Further, the packet lengths and the number of pieces of data of a packet to be transmitted are limited by the I/O bridge 18 to avoid influence of a difference in lengths of the links L1 if any.

The embodiment therefore makes it easier to design the circuit board to construct a fault-tolerant computer system and design the casing of the computer system.

Figure 10:
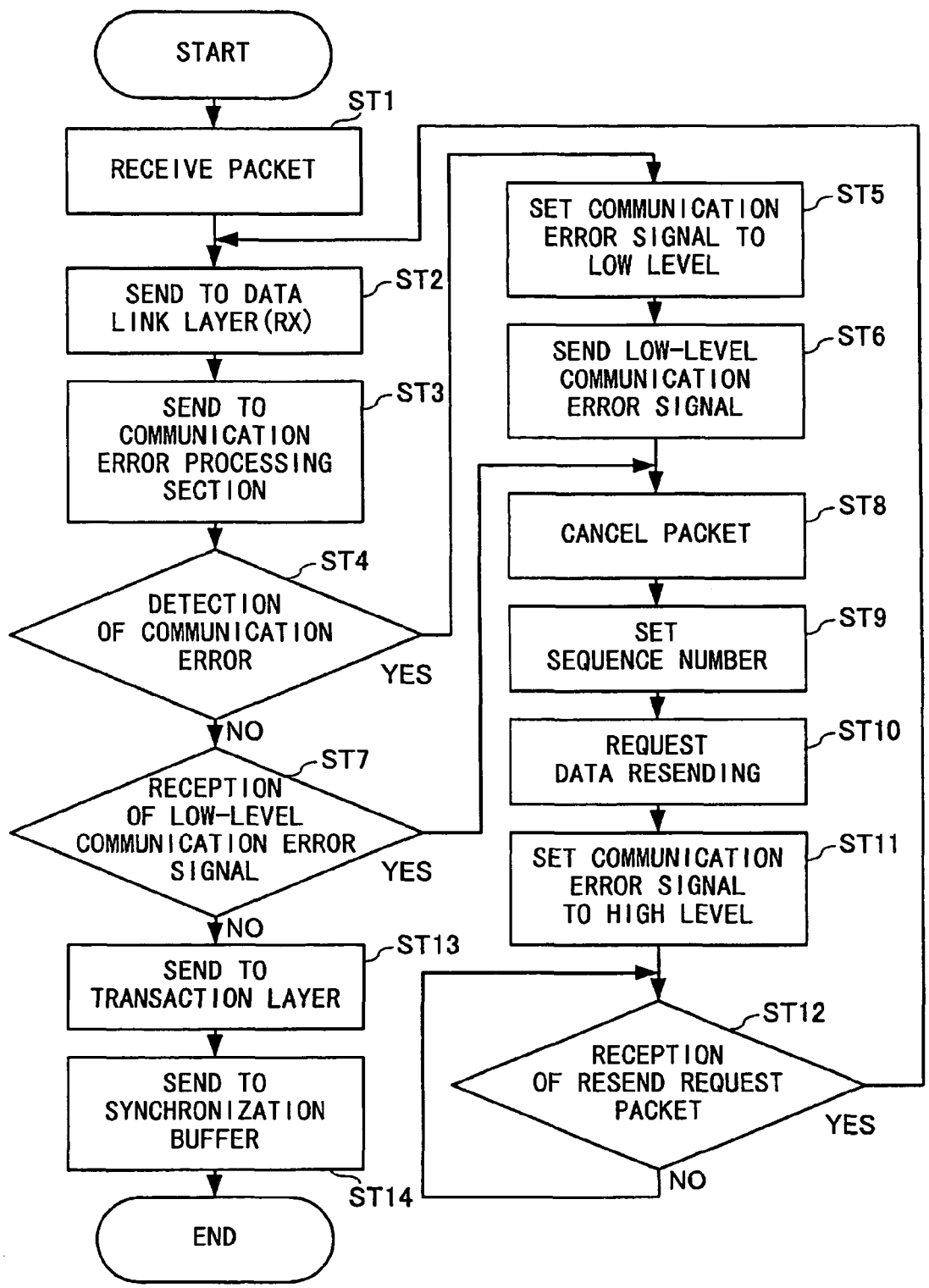
FIG. 10 is a flowchart illustrating the procedures of the operation of the computer system according to the embodiment of the invention.

The procedures of the operation of the computer system according to the embodiment of the invention are described referring to FIG. 10.

FIG. 10 is a flowchart illustrating the procedures of the processing of data received in one period of the sync signal S1 in the interface circuit section 40.

First, at step 1 (ST1), the interface circuit section 40 receives packets, sent from the I/O bridge 18, at the physical layers 43-1 to 43n according to the sync signal S1 shown in FIG. 4A.

At the next step 2 (ST2), the interface circuit section 40 temporarily stores all packets, received in one period of the sync signal S1, in the elastic buffer, as shown in FIG. 4B, and then sends the packets to the data link layer (RX) 44.

At the next step 3 (ST3), the interface circuit section 40 sends the received data to the communication error processing section 46. As shown in FIG. 4C, the communication error processing section 46 acquires the data in synchronism with the rising of the sync signal S1.

At the next step 4 (ST4), the communication error processing section 46 checks the CRC included in the data link layer packet to determine if a communication error is detected.

When a communication error is detected, the flow goes to step 5 (ST5) where the communication error processing section 46 asserts the communication error signal S2 or sets the communication error signal S2 to a low (L) level in synchronism with the rising of the sync signal S1 to enable the error, as shown in FIG. 6D.

Then, at step 6 (ST6), the communication error processing section 46 sends the asserted (low-level) communication error signal S2 to the interface circuit section of the memory bridge 26 via the signal line. Accordingly, a plurality of interface circuit sections can share error information on received packets. As the communication error signal S2 is synchronous with the rising of the sync signal S1, the plural interface circuit sections can share synchronous error information.

At step 7 (ST7), the communication error processing section 46 determines whether the asserted (low-level) communication error signal S2 has been received from the interface circuit section of the memory bridge 26 or not. When the asserted communication error signal S2 has been received, the communication error signal S2 is asserted in synchronism with the rising of the sync signal SI even if the interface circuit section 40 of the memory bridge 16 does not detect a communication error, as shown in FIG. 8D.

When the communication error signal S2 is asserted, the flow goes to step 8 (ST8) where the communication error processing section 46 cancels all the packets received in one period of the sync signal S1 as shown in FIGS. 6E and 8E. As the communication error signal S2 is asserted, no packet is sent to the transaction layer 47 in synchronism with the next rising of the sync signal S1. Therefore, the sending of packets to the transaction layer 47 is stopped. Further, packets in the next period are canceled.

At the next step 9 (ST9), the communication error processing section 46 sets the sequence number of a packet to be received next, which is managed by the data link layer (RX) 44, to the value prior to the occurrence of the error. This can stop reception of other packets until the packet whose communication error has been detected is received.

At the next step 10 (ST10), the communication error processing section 46 request the I/O bridge 18 or the data sender to resend data. In response to the request, the I/O bridge 18 sends the requested packet to the memory bridges 16 and 26. Even when a single interface circuit section detects a communication error, therefore, a plurality of interface circuit sections can receive same data synchronously.

At the next step 11 (ST11), the communication error processing section 46 deasserts the communication error signal S2 or sets the communication error signal S2 to a high (H) level in synchronism with the rising of the sync signal S1 to disable the error, as shown in FIGS. 6D and 8D. As other packets than the canceled packet are not received until the canceled packet is resent, the communication error signal S2 can be deasserted.

At the next step 12 (ST12), the interface circuit section 40 determines whether the packet corresponding to the resend request has been received or not.

When the packet is not received, step 12 is repeated. When it is determined the packet has been received, the flow returns to step 2 and the interface circuit section 40 receives the canceled packet and subsequent packets, as shown in FIGS. 7A to 7E.

When no communication error is detected at step 4 and the asserted communication error signal S2 is not received at step 7, the communication error signal S2 is not asserted as shown in FIG. 4D. In this case, the flow goes to step 13 (ST13) where the communication error processing section 46 sends the packet to the transaction layer 47 in synchronism with the next rising of the sync signal Si as shown in FIG. 4E. Further, the communication error processing section 46 sends status information to the transaction layer 47 and the data link layer (TX) 45. According to the status information, the interface circuit section 40 regularly returns the ACK signal to the I/O bridge 18 which has sent the data.

The flow then goes to step 14 (ST14) where the interface circuit section 40 acquires data from the transaction layer packet and sends the data to the synchronization buffer 50 as shown in FIG. 4F.

The individual steps can be modified adequately according to the conditions. For example, step 9 at which the sequence number is set can be executed before step 8 at which a packet is canceled, or these steps can be executed in parallel. Further, step 7 at which reception of the communication error signal S2 is determined can be executed before step 4 at which detection of a communication error is determined, or these steps can be executed in parallel.

A computer can be allowed to execute the procedures of the operation by a computer program. The computer program can be recorded a computer readable recording medium, such as a floppy disk, CD-ROM or hard disk. In the embodiment of the invention, as the program is installed on the computer, for example, the computer program is loaded into the main memory unit 15, the computer can perform the operation described above.

The invention is not limited to the embodiment described above and can be worked out in various embodiments.

Figure 11:
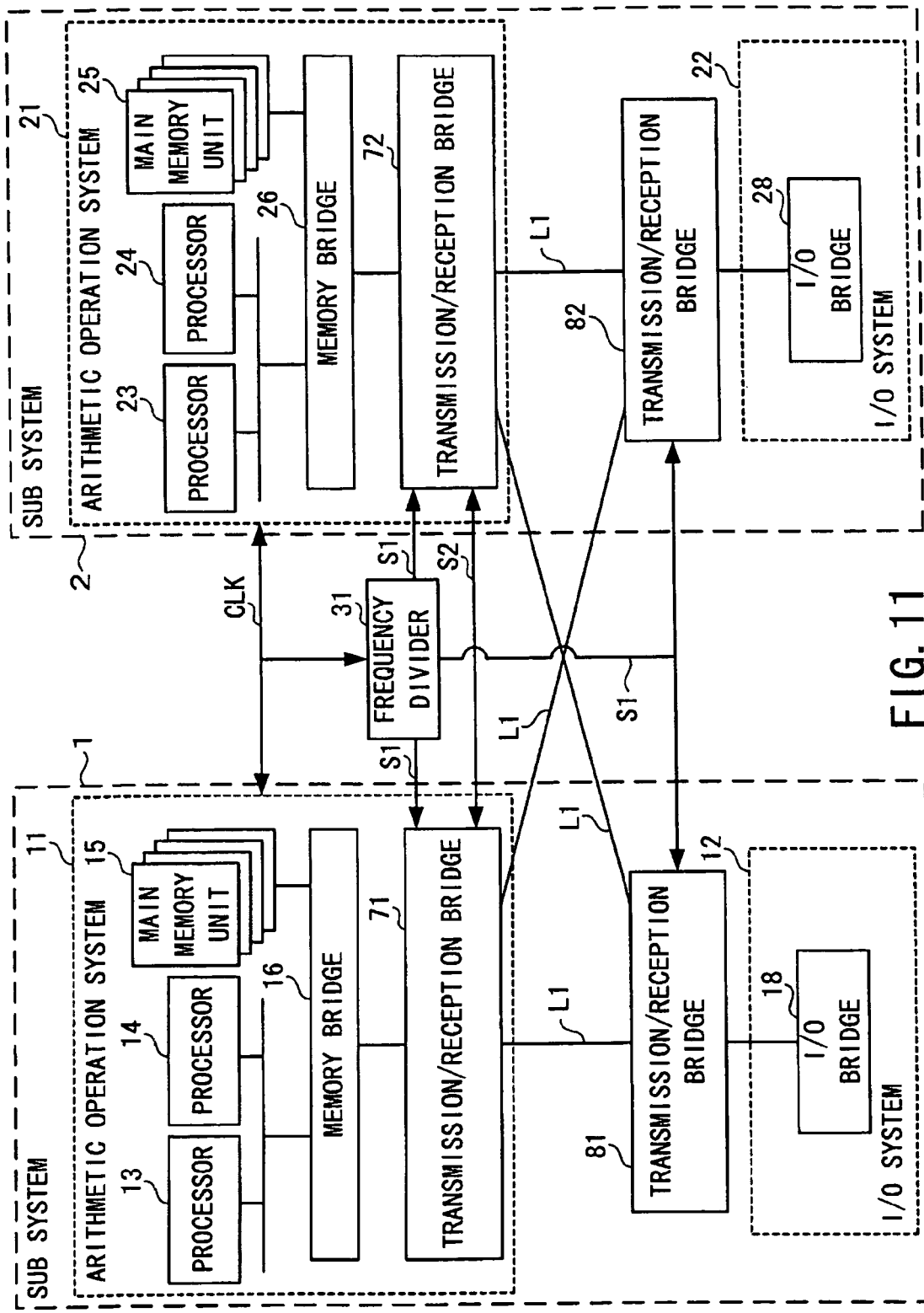
FIG. 11 is a block diagram showing an application example of the computer system according to the embodiment of the invention.

For example, each of the memory bridges 16 and 26 and the I/O bridges 18 and 28 is so constructed as to have an interface circuit section in the embodiment. However, the arithmetic operation systems 1I and 21 may respectively have transmission/reception bridges 71 and 72 in addition to the memory bridges 16 and 26, as shown in FIG. 11. Further, the arithmetic operation systems 11 and 21 may respectively have transmission/reception bridges 81 and 82 in addition to the I/O systems 12 and 22.

In this case, each of the transmission/reception bridges 71, 72, 81 and 82 has a communication error processing section. The transmission/reception bridges 71 and 72 are connected to the memory bridges 16 and 26, respectively. The transmission/reception bridges 81 and 82 are connected to the I/O bridges 18 and 28, respectively.

The transmission/reception bridges 71 and 72 and the transmission/reception bridges 81 and 82 synchronously perform data exchange according to the lock-step system. The transmission/reception bridges 71 and 72 are connected to the existing memory bridges 16 and 26 by one set of communication links. The connection is achieved by fast serial links that are supported by the existing memory bridges. In this case, the length of the link between the memory bridge 16 and the transmission/reception bridge 71 and the length of the link between the memory bridge 26 and the transmission/reception bridge 72 are made as short as possible in order to avoid occurrence of a communication error originating from a difference in reception timing.

This structure can realize a fault-tolerant computer system while using existing system chip set components as they are.

In the embodiment, the computer system takes a double redundant architecture that has two sub systems 1 and 2 which respectively have two processors 13 and 14 and two processors 23 and 24. The architecture of the computer system is not however restrictive and can take a triple redundant architecture or an architecture having a greater number of redundancy levels.

The embodiment has been explained as an example which uses the PCI-Express interface for fast serial links. The link system is not however limited to this particular type. For example, other fast serial links of InfiniBand, HyperTransport or the like may be used instead of the PCI-Express.

The foregoing description of the embodiment has been given of the case where the memory bridges 16 and 26 exchange serial data with the I/O bridges 18 and 28. The data to be exchanged may be parallel data instead of serial data.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2003-115621 filed on Apr. 21, 2003 and including specification, claims, drawings and summary. The disclosure of the above Japanese Patent Application is incorporated herein by reference in its entirety.

What is claimed is:

1. A data processing apparatus that has a plurality of reception interface sections which receive same data from a same data sender and processes data, received by said plurality of reception interface sections, in parallel, comprising:

a frequency divider which generates a sync signal by dividing a frequency of a predetermined clock signal and sends said generated sync signal to each of said reception interface sections and said data sender, wherein each of said reception interface sections receives data, which is divided by said data sender to data of a data length shorter than one period length of said sync signal supplied from said frequency divider, from said data sender according to said sync signal, wherein each of said reception interface sections includes a communication error processing section which, upon occurrence of an error in said received data by one of said reception interface sections, stops receiving said data, sends a communication error signal to all other of said reception interface sections to stop data reception from said data sender, and requests said data sender to resend data, wherein each of said reception interface sections includes an arithmetic operation unit, an I/O unit, and a memory bridge that provides data from said arithmetic operation unit to said I/O unit of the respective reception interface section, wherein said error in said received data is detected by said memory bridge of said one of said reception interface sections, and wherein said memory bridge of said one of said reception interface sections sends the communication error signal to said other memory bridges of said other reception interface sections, and further comprising:

a transaction layer that receives the communication error signal output from the communication error processing section;

an internal circuit section; and a synchronization buffer that exchanges data between the transaction layer and the internal circuit section, wherein the internal circuit section acquires data held in the synchronization buffer at a timing synchronous with said sync signal and sends the acquired data to a processor external to the data processing apparatus.

2. The data processing apparatus according to claim 1, wherein when an error occurs in part of received data, said communication error processing section of each of said reception interface sections cancels said error-occurred data, and requests said data sender to resend said canceled data.

3. The data processing apparatus according to claim 1, wherein said data sender sends same serial data, and when an error occurs in received serial data, said communication error processing section of each of said reception interface sections cancels said error-occurred serial data and serial data received following that error-occurred serial data, and requests said data sender to resend said canceled serial data.

4. The data processing apparatus according to claim 1, wherein said data sender sends said data packet by packet with a sequence number affixed to each packet, and when an error occurs in data of the received packet, said communication error processing section of each of said reception interface sections requests said data sender to resend data packet by packet based on said sequence number affixed to each packet received.

5. A data processing method of a data processing apparatus that performs parallel processing of data received by a plurality of reception interface sections which receive same data from a same data sender and comprises:

a frequency division step of generating a sync signal by dividing a frequency of a predetermined clock signal and sending said generated sync signal to each of said reception interface sections and said data sender;

a data reception step of receiving data, which is divided by said data sender to data of a data length shorter than one period length of said sync signal generated in said frequency division step, from said data sender at each of said plurality of reception interface sections according to said sync signal;

an error detection step of detecting an error in said received data by one of said reception interface sections; and an error information output step of outputting information on said detected error by said one of said reception interface sections to all other of said reception interface sections, wherein each of said reception interface sections includes an arithmetic operation unit, an I/O unit, and a memory bridge that provides data from said arithmetic operation unit to said I/O unit of said respective reception interface section, wherein said error detection step comprises detecting said error in said received data by said memory bridge of said one of said reception interface sections, and wherein said error information output step comprises sending, by said memory bridge of said one of said reception interface sections, said information on said detected error to said other memory bridges of said other reception interface sections, and further comprising: receiving, by a transaction layer, a communication error signal output in the error information output step;

exchanging data, by a synchronization buffer, between a transaction layer and an internal circuit section, wherein the internal circuit section acquires data held in the synchronization buffer at a timing synchronous with said sync signal; and sending the acquired data by the internal circuit section to a processor external to the data processing apparatus.

6. The data processing method according to claim 5, wherein said error information output step is executed according to said sync signal.

7. The data processing method according to claim 6, further comprising:

an error information reception step of receiving error information, output from said other reception interface sections, at said one of said reception interface sections; and a data resend requesting step of requesting said data sender to resend data in at least one of a case where an error is detected at said error detection step and a case where error information is received at said error information reception step.

8. The data processing method according to claim 7, further comprising:

a data cancellation step of canceling data; and a data reception stopping step of stopping data reception, and wherein said data cancellation step and said data reception stopping step are executed in at least one of a case where an error is detected at said error detection step and a case where error information is received at said error information reception step, and said data resend requesting step requests resending of data canceled at said data cancellation step.

9. The data processing method according to claim 8, wherein said data cancellation step is executed according to said sync signal.

10. A non-transitory computer readable medium having thereon a computer program, which when executed, performs parallel processing of data received by a plurality of reception interface sections which receive same data from a same data sender and allows a data processing apparatus to execute:

a frequency division step of generating a sync signal by dividing a frequency of a predetermined clock signal and sending said generated sync signal to each of said reception interface sections and said data sender;

a data reception step of receiving data, which is divided by said data sender to data of a data length shorter than one period length of said sync signal generated in said frequency division step, from said data sender at each of said plurality of reception interface sections according to said sync signal;

an error detection step of detecting an error in said received data by one of said reception interface sections; and an error information output step of outputting information on said detected error by said one of said reception interface sections to all other of said reception interface sections, wherein each of said reception interface sections includes an arithmetic operation unit, an I/O unit, and a memory bridge that provides data from said arithmetic operation unit to said I/O unit of said respective reception interface section, wherein said error detection step comprises detecting said error in said received data by said memory bridge of said one of said reception interface sections, and wherein said error information output step comprises sending, by said memory bridge of said one of said reception interface sections, said information on said detected error to said other memory bridges of said other reception interface sections, and wherein said data processing apparatus is allowed to further execute: receiving, by a transaction layer, a communication error signal output in the error information output step;

exchanging data, by a synchronization buffer, between a transaction layer and an internal circuit section, wherein the internal circuit section acquires data held in the synchronization buffer at a timing synchronous with said sync signal; and sending the acquired data by the internal circuit section to a processor external to the data processing apparatus.

11. The computer readable medium according to claim 10, wherein said error information output step is executed according to said sync signal.

12. The computer readable medium according to claim 11, wherein said data processing apparatus is allowed to further execute:

an error information reception step of receiving error information, output from said other reception interface sections, at said one of said reception interface sections; and a data resend requesting step of requesting said data sender to resend data in at least one of a case where an error is detected at said error detection step and a case where error information is received at said error information reception step.

13. The computer readable medium according to claim 12, wherein said data processing apparatus is allowed to further execute:

a data cancellation step of canceling data; and a data reception stopping step of stopping data reception, and said data cancellation step and said data reception stopping step are executed in at least one of a case where an error is detected at said error detection step and a case where error information is received at said error information reception step, and said data resend requesting step requests resending of data canceled at said data cancellation step.

14. The computer readable medium according to claim 13, wherein said data cancellation step is executed according to said sync signal.

15. The data processing apparatus according to claim 1, wherein said memory bridge of said one of said reception interface sections sends the communication error signal to said other memory bridges of said other reception interface sections as an open drain signal.

16. The data processing method according to claim 5, wherein, in said error information output step, said memory bridge of said one of said reception interface sections sends the communication error signal to said other memory bridges of said other reception interface sections as an open drain signal.

17. The computer readable medium according to claim 10, wherein, in said error information output step, said memory bridge of said one of said reception interface sections sends the communication error signal to said other memory bridges of said other reception interface sections as an open drain signal.

* * * * *